Dec. 14, 1937. G. H. FRASER 2,102,313
DRIVE AND DIFFERENTIAL
Original Filed Nov. 21, 1932
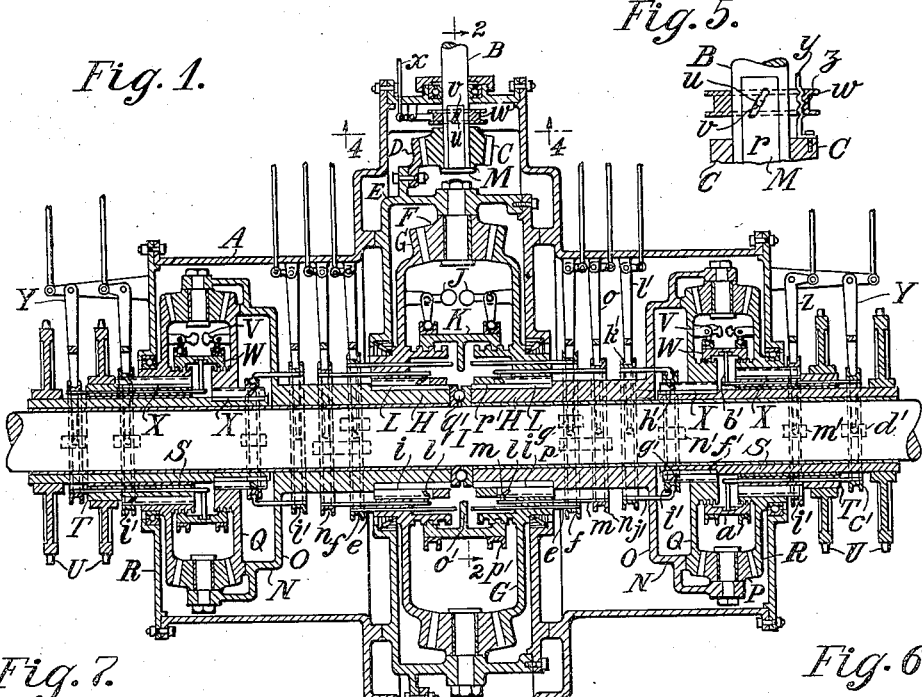
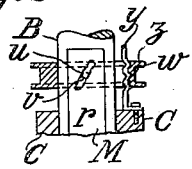
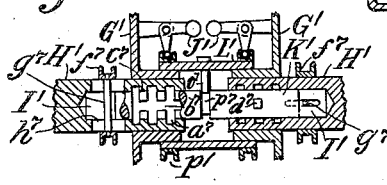
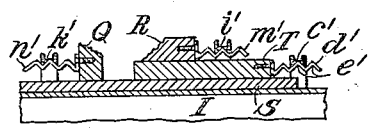
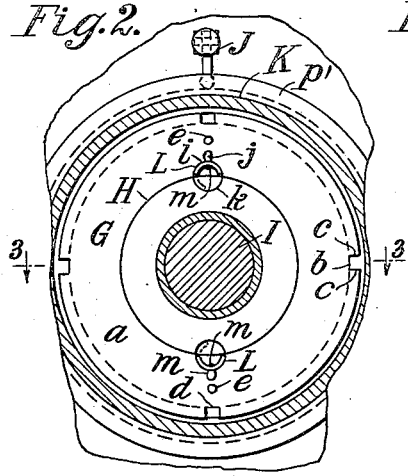
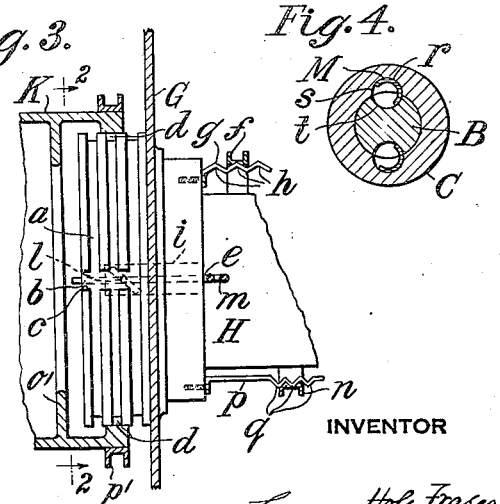
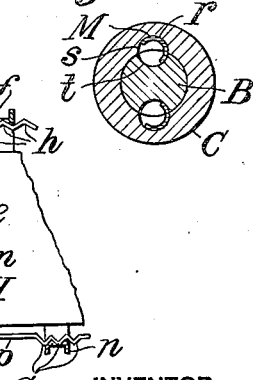
INVENTOR
George Holt Fraser Patented Dec. 14, 1937

2,102,313

UNITED STATES PATENT OFFICE 2,102,313

DRIVE AND DIFFERENTIAL

George Holt Fraser, Brooklyn, N. Y.

Original application November 21, 1932, Serial No. 643,664. Divided and this application November 16, 1935, Serial No. 50,223

20 Claims. (Cl. 74—316)

This is a division of my application Serial No. 643,664, filed November 21, 1932, of which the following is a specification.

This invention relates to driving mechanism and rotary transmissions, and aims to provide certain improvements therein.

It especially relates to clutches or couplings for differential motion devices, such as differential members or axles, and aims to provide improved clutch or coupling means for facilitating and controlling differentiation thereof and for facilitating manual and automatic control thereof.

To this end in carrying out the preferred adaptation of my present improvements as applied to differential axle members I preferably provide each in operative relation to the other with a rotation and differentiation permission provision, as a circumferential groove, and with a differentiation restraint provision, as an axial recess in communication with said groove, and I preferably provide clutch means having reciprocal co-operable provisions in co-operable engagement with said provisions respectively, and operable when in one position to permit differentiation and when in another position to resist it, which provisions are preferably movable in the same direction at the same time and operable to simultaneously permit or resist differentiation while in engagement with said first provision, and operable while in differential engagement therewith to permit relative differentiation within predetermined limits and until said resistance provisions attain coincidence, and thereby to permit said first resistance provisions to attain coincidence and then permit engagement of said second resistance provisions therewith for then simultaneously resisting differentiation; and I provide improved means for automatically centrifugally controlling and operating said clutch means without molestation from manual operating means, as by a rotation permission lost motion provision between such operating means and the clutch means; and I preferably provide improvements in the construction and operation of such clutches and provisions and operating means, and various other features of improvement, all of which will be more fully hereinafter set forth in their preferred form as applied to differentially driven axles such as those shown in my said application, and with reference to the accompanying drawing, which are copies of those therein and have the same figure numbers and reference letters, in which—

Fig. 1 is a fragmentary horizontal axial section of a triple differential assembly embodying the preferred form and arrangement of my improvements, showing the clutches disengaged;

Fig. 2 is an enlarged fragmentary vertical transverse section of the clutch for the main differential gears, cut approximately on the plane of the line 2—2 in Fig. 1 and looking in the direction of the arrow;

Fig. 3 is an enlarged fragmentary horizontal section thereof, cut approximately on the plane of the lines 3—3 in Fig. 2, and showing the hub of one of the main differential gears in plan;

Fig. 4 is an enlarged fragmentary cross-section of the main drive pinion, showing its clutches drivingly engaged and cut approximately on the plane of the lines 4—4 in Fig. 1 and looking in the direction of the arrow;

Fig. 5 is an enlarged fragmentary horizontal axial section thereof showing the main drive shaft and its clutch in plan and in its unclutched position;

Fig. 6 is an enlarged fragmentary vertical transverse section of one of the auxiliary differential clutches, showing its clutch engaged, and Fig. 7 is a fragmentary vertical axial section of the axles and differential gears keyed thereto respectively of a single differential drive, showing the preferred application of my invention for such a simple differential drive, for either manual or automatic control of differentiation.

Referring to the drawing A is a main housing for encasing a differential drive mechanism, B is a main shaft for revolving such mechanism, C is a main bevel pinion on such shaft, D is a main bevel gear meshing with and revolved by such pinion, E is a master member carrying such gear and revolved therewith, F are planetary bevel pinions carried by and revolved with and rotatable relatively to the master member E, G are opposed bevel gears in mesh with and revolved by and revoluble relatively to the pinions F, for revolution with and differential revolution relatively to the master member E, and H are separate shafts for the gears G respectively, for propulsively transmitting revolution of the master member to the opposite drive wheels of a vehicle, and for permitting differentiation in the revolution of the shafts, according to any well known principle of differential drive.

These parts may be of any usual or suitable construction and principle of operation, and may be connected and anti-frictionally revolubly mounted in any suitable way.

For a single drive vehicle using a single differential each separate shaft H is usually connected directly to its propulsion wheels, but for a four wheel drive vehicle using additional differentials each shaft H is usually connected to the master member of an additional differential for affording differentiation for its front and rear propulsion wheels in addition to the differentiation afforded by the main differential, and in such case the shafts H are usually tubular and both mounted revolubly on a through shaft I, which is usually a non-rotary carrier shaft or jack-shaft for sustaining the differential assembly in juxtaposition to the several drive connections between it and the propulsion wheels.

Such a single differential construction is shown in my Patent No. 1,838,380 dated Dec. 29, 1931, in which I have shown and claimed an automatically centrifugally actuated and controlled differentiation controller and restrainer revolved with and rotatable relatively to the master member, by being connected with a planetary pinion, so that it is centrifugally actuated by such revolution to permit differentiation during normal revolution, and is centrifugally actuated by rotation of the planetary pinion to restrain differentiation during such rotation.

One feature of my present invention aims to provide improved control and restraint of differentiation by utilization of the revolution of the differential gears for permitting differentiation during normal revolution of such gears and for resisting differentiation during differential revolution of such gears, as distinguished from my said utilization of the rotation of a planetary pinion for such purpose, and according to this feature of my present improvements I preferably provide centrifugally actuated and restrained controllers J on the opposed gears of the differential, and a centrifugally actuated and restrained clutch K in operative relation to and counter-balancingly poised between such controllers, and movable into and out of clutch engagement with said gears or their respective shafts for non-rotatively locking the gears rotatively together to resist differentiation, and for rotatively freeing such parts to permit differentiation.

The gears G may be any members which are rotatable together and differentially about the same axis, and each may be rotated in any usual or suitable manner, the axles or shafts H may be any axle or shaft members which are rotatable together and differentially about the same axis, and may be rotated in any usual or desired manner, and may be axially connected and antifrictionally revolubly mounted in any suitable way, and of any desired number.

In my said patent I have shown and claimed orbital pinions differential rotation of which was automatically controlled by a centrifugally actuated clutch rotatable therewith, and have claimed such a clutch applied thereto, and in my said application I have shown and claimed an orbital differential in which differentiation is controlled by centrifugally automatically actuated restrainer means rotatable with the differential gears respectively, for actuating a clutch therebetween upon differentiation thereof.

My present application is a clutch division of my said application and relates to the improvements in clutches therein shown, which it aims to cover for any desired utilization thereof, as distinguished from the particular combination including their use claimed in my said application.

According to my present invention I provide improved rotation permission and differentiation prevention means between any members which are rotatable together and differentially about the same axis, preferably by providing each member with a rotation permission provision $a$ and a differentiation prevention provision $c$ in communication with each other and adjacent in operative relation to those of the other member, and by providing an axially movable clutch means K having rotation permission engagement with the provisions $a$ respectively and axially movable in the same direction at the same time into rotation prevention engagement with the provisions $c$ for simultaneously locking each axle to the other and preventing their differentiation.

Preferably each driven member is provided with a cylindrical portion adjacent and in operative relation to that of the other, and the clutch means is provided with reciprocal cylindrical portions in engagement with said cylindrical portions respectively and axially slideable thereon, and the provisions $a$ are circumferential grooves in the cylindrical portions of the members, and the resistance provisions $c$ are axially extended faces at the sides of and in communication with these grooves, and are preferably formed by keyways or recesses $b$ extended axially of the peripheries and in communication with the grooves and the resistance provisions on the clutch are preferably projections extended from its cylindrical peripheries into the grooves $a$ respectively and movable simultaneously in the same direction into the recesses $b$ respectively and the clutch means is moved from its rotation permission to its differentiation prevention position.

The projections $d$ are preferably axially fixed relatively to the clutch means in such spaced relation that each will coincide with the corresponding groove $a$, and during differentiation they are in rotative engagement with these grooves and co-operate with them to axially restrain the members during which axial restraint they are in rotative engagement with their grooves respectively and thereby permit the members to normally differentiate when the clutch means is inoperative, and when it is changed to operative stress they also permit differentiation until the recesses $b$ come into coincidence, whereupon the projections $d$ simultaneously enter these recesses and by engagement with the provisions $c$ simultaneously lock the members together and thereby prevent differentiation.

Preferably a plurality of grooves $a$ is provided, and the recesses $b$ are in communication with and extended axially from each side of these, and the clutch means is axially movable in both directions, so its projection $d$ may be moved out of a groove from either side thereof for differentiation resistance, and into the next groove for rotation permission, and so that the clutch means may be moved in one direction from one side and in the other direction from the other side, in which case a central groove is preferably used when the clutch means are automatically operated and one or the other of parallel side grooves is used when automatic operation is not desired.

The clutch means may be operated in any suitable manner, but according to one feature of my present invention I preferably provide centrifugally actuated and restrained counter-active controllers J rotatable with the relatively rotatable members G and centrifugally actuated by differentiation thereof, and having opposed radially movable weighted ends and having axially movable ends which revolubly engage grooves $p'$ in the clutch means K, which counteracts the centrifugal means when they are balanced during normal rotation, but permits them when they are unbalanced by differentiation to move the clutch means axially when the recesses $b$ come into coincidence, and thereby to automatically arrest differentiation.

Axial restraint of the clutch means K by the grooves $a$ resists minor fluctuations of the centrifugal controllers J during normal operation and until they are sufficiently unbalanced to move the projection $d$ into the recesses $b$ when they come into coincidence, whereby such axial restraint serves to prevent molestation of normal differentiation by minor fluctuations of the centrifugal control.

Another feature of my present invention provides for supplementing said automatic control of differentiation with manual control thereof without molestation of the latter with the former preferably by providing a rotation permission lost motion connection between the automatically operated clutch means and means for manually operating the latter, for which purpose I preferably provide the axially movable manual operators $e$ in rotative spaced relation to an operative provision $o'$ which is between and in spaced relation to the members G and in the path of and spaced from the manual operators $e$, so that the clutch may be axially moved automatically without molestation from the latter, while either of the latter may be moved axially to overcome the stress of the automatic operator and to move the clutch manually in one direction or other for manual control of differentiation in either direction or for elimination of automatic control, and the other may be reversely moved for manually restoring automatic control and operation.

Another feature of my present improvements provides for elimination of automatic control when not desired, preferably by providing a plurality of grooves $a$ and utilizing the central one for automatic control and each of the adjacent ones for elimination thereof, which are accomplished by spacing the provision $a$ from the manual operators $e$ sufficiently to permit the projections $d$ to operate in the central groove $a$ and into the recesses $b$ at each side thereof within the limits within which they should be automatically operated between the ends of the manual operators, which are normally spaced predetermined distances from the provision $o'$ and held in such position by springs $g$, the projections $h$ on which engage a corresponding notch in the groove ring $f$ by which they are manually operated, which ring is held in a mid position for permitting automatic control, and in an inner or outer position for eliminating automatic control by moving the clutch K into and holding it in an adjacent groove $a$, in which the projection $d$ may then revolubly engage without molestation from automatic stress until such time as the manual operators are restored to their mid positions for permitting automatic control and providing lost motion clearance therefor.

In normal operation the projections $d$ of the clutch K will be in rotation permission and axial restraint engagement with the central grooves of the relatively rotatable members, and these and the clutch will be axially positioned and restrained by such engagement, which will permit either member to differentiate relatively to the clutch or to the other. When the clutch is subjected to operative stress in either axial direction, such stress will be resisted by such engagement until the recesses $b$ attain coincidence, whereupon the projections $d$ will simultaneously move in the same direction at the same time and thereby respectively simultaneously engage the corresponding faces $c$, and thereby prevent differentiation and cause the clutch and members to rotate together. When this stress is yieldably or resistably applied, as by the centrifugally actuated operators J, the clutch K will axially restrain the operating stress and will permit differentiation until recesses $b$ attain coincidence which will then permit the clutch to respond to the operating stress and prevent differentiation. When the centrifugal operators J act in opposition to each other the clutch K will counter-actingly connect and counter-balance and restrain them during normal rotation and during minor differentiation and until by excessive differentiation they become so unbalanced that one centrifugally overcomes the other sufficiently to operate the clutch which will resist this stress and permit continued differentiation within limits which will be determined by attainment of coincidence of the recesses $b$.

When manual resistance of differentiation is desirable either manual operator $e$ will be moved in excess of its clearance relation to the clutch K sufficiently to overcome the automatic operator if used, and to move the projections $d$ into engagement with the adjacent faces $c$ when the recesses $b$ come into coincidence and will hold the clutch in this position and restrain automatic operation until differentiation is again desired, to permit which the manual operator will be retired for permitting the automatic operator J when used to automatically restore the clutch to differentiation position, or the other operator $e$ will be used to manually restore the clutch to differentiation position. For complete elimination of automatic control of differentiation either manual operator $e$ will be used to move the projections $d$ from the central grooves $a$, through the recesses $b$ and into one of the outer grooves $a$, in which it will permit differentiation so long as this manual operator holds the clutch in this position and thereby restrains automatic operation of it.

My improvements in clutches may be availed of in connection with any members rotatable together or differentially about the same axis, such for example as differential axles, but are especially applicable to the differentially driven axles of vehicles, such for example as the several differentially driven propulsion axles for four wheel vehicles shown and claimed in my said application and shown in the present drawing.

In this utilization a clutch M is shown between the master pinion C and the main shaft B comprising keys $r$ mounted in keyseats in the pinion and reversely oscillated into keyways $t$ in the shaft by pins $u$ axially movable in slots $v$ in the keys and carried by a cam $w$ which is moved axially by an operator $x$ for oscillating the keys $r$, and which is held in axial position by projections on a spring $y$ carried by the pinion and in engagement with a notch $z$ in the collar $w$.

In this construction the members G and axles H are shown as disconnectable members connected by a clutch L comprising keys $i$ in keyseats $j$ and oscillatory into keyways $k$, which keys are axially positioned by collars $r'$ and have inclined slots $l$ engaged by oscillators $m$ which are moved axially for oscillating them by grooved rings $n$ which are moved by levers $o$. Each ring $n$ is axially positioned by a spring $p$ fixed to the member G and having projections $q$ in engagement with the ring $n$. Ball bearings $q'$ are shown as axially spacing the axles H.

In this construction each axle H carries an auxiliary differential N comprising an auxiliary master member O carrying planetary pinions P in engagement with an inner differential gear Q and an outer differential gear R. The gear Q is shown as connected to a tubular shaft S, and the gear R as connected to a tubular shaft T, each being coupled to its shaft by a key $f'$ having a cam slot $g'$ engaged by a pin $h'$ carried by a grooved ring $i'$ engaged by a hook rod $j'$ carried by a grooved ring $k'$ which is moved axially by an operator $l'$. One ring $i'$ is shown as moved by an operator Z and as axially positioned by a notch spring $m'$ carried by the gear R, and the ring $k'$ being axially positioned by a notch spring $n'$ carried by the gear Q. The shafts S and T are shown as provided with sprocket drive provisions U.

In this utilization the hubs of the members G are preferably connected by the clutch K and the axial restraint rotation permission and the differentiation prevention provisions constructed and operated as hereinbefore described for automatic and manual operation, and the hubs of the gears Q and R are provided with said peripheral grooves which are connected by clutch means W automatically operated by centrifugal operator means V, similar in construction and operation to those before described, but which are preferably manually operated by a single manual operator $b'$ in lost motion engagement with an internal groove $a'$ in a clutch W, and carried by a grooved ring $c'$ which is axially moved by an operator Y and is axially positioned by a spring $d'$ carried by the shaft T and having projections $e'$ in engagement with the ring $c'$.

In such a construction each pair of differentially rotatable members is axially restrained during differentiation and is subjected to automatic or manual control of differentiation independently of another pair thereof.

It will be seen that my invention provides improvements which can be generally availed of, and it will be understood that the invention is not limited to the particular details of construction, arrangement, combination, or use, set forth as constituting the preferred form or utilization thereof, since it can be employed according to such modifications of these as circumstances, or the judgment of those skilled in the art, may dictate without departing from the spirit of the invention.

One such modification is shown in Fig. 7, in which driven members G' are fixed to differential axles or shafts H' and have smooth cylindrical hubs reciprocal to and extended toward each other, on which axially slides a smooth tubular sleeve L', which has peripheral grooves $p'$ engaged by and restraining the axially swingable arms of opposed centrifugal means J' mounted on and rotatable with the members G' respectively and operable to move the sleeve L' axially automatically upon differentiation in the manner before described.

In this construction the slideway I' is shown as a cylindrical socket in the end of each axle H' and as having internal axial restraint and rotation permission grooves $a7$ and differentiation prevention faces $c7$, and axial recesses $b7$ in communication with the grooves, and the clutch K' is shown as a cylindrical bolt axially slideable in the sockets I' and having axially spaced axial restraint and rotation permission and differentiation prevention projections $d7$ coincident with the central ones of the three grooves $a7$ respectively when in rotation permission position, and simultaneously axially movable in the same direction into differentiation prevention engagement with the adjacent faces $c7$ respectively for differentiation prevention, and into adjacent grooves respectively for unmolested differentiation permission.

In this construction the bolt K' is preferably manually operated from a spaced distance from its ends by groove collars $f7$ carrying axle pins $g7$ normally in spaced relation to its ends, either of which is slideable into operative relation with the adjacent end of the bolt when slid in an axially extended slot $h7$ in its shaft H'.

In this construction when automatic operation of the clutch is desired the sleeve L' is preferably connected to the bolt K' by a radial pin $o7$ in axial lost motion connection with a clearance peripheral groove $p7$ in the bolt K', sufficient to prevent molestation of the bolt by minor fluctuations of the automatic operator provision, to the end that the bolt may not be clutchingly engaged until a major differentiation suffices to automatically operate it. The normal clearance between the pins $g7$ and the bolt K' should preferably permit unmolested operation of the latter by the centrifugal operator means J' when this is used.

Although for the purpose of more fully illustrating the applicability of my improved clutch, I have shown the preferred form thereof as utilized in connection with a differential gear transmission provided with a circumferentially oscillatory semi-cylindrical radially yieldable key $r$ or X, having a circumferential oscillation provision $u$, and oscillated by an oscillator $v$, these are not claimed herein being generically and specifically claimed in my companion application Serial No. 610,807, filed May 12, 1932.

Although for the purpose of more fully illustrating the preferred utilization of my improved clutch, I have shown it as used in connection with the clutch controlled orbital differential drive improvements shown in my companion application Serial No. 50,674, filed Nov. 20, 1935 as a continuation of my original application Serial No. 643,664, filed Nov. 21, 1932, of which original application the present application is a division, said improvements in clutch controlled orbital differential drives are not claimed herein, being claimed as a drive and as a part of a differential gearing, in my said application Serial No. 50,674, filed Nov. 20, 1935.

What I claim is:

1. In rotation transmissions, members revoluble together and differentially about the same axis, one having a rotation permission and prevention clutch provision axially intermediate of said members and in operative relation to the other thereof, and rotation permission and differentiation prevention movable clutch means axially intermediate of and common to said members, rotatable with one thereof and in revoluble engagement with and revoluble relatively to said clutch provision of the other of said members when in one position, and in differentiation prevention engagement with and revoluble with said provision when in another position, and means for moving said clutch means.

2. In rotation transmissions, members rotatable together and differentially about the same axis, one having an annular rotation permission and prevention clutch provision axially intermediate of said members and reciprocal to the other, rotation permission and differentiation prevention movable clutch means axially of and common to said members, rotatable with one of said members and having a clutch provision in revoluble engagement with and revoluble relatively to said annular provision when in one position and then operable to permit said differentiation, and movable into rotation prevention engagement with and revoluble with said provision when in another position, and then operable to resist differentiation, and means for moving said clutch means.

3. In rotation transmissions, members rotatable together and differentially about the same axis, the one having a peripheral rotation permission and prevention clutch provision axially intermediate of said member, rotation permission and differentiation prevention movable clutch means axially intermediate of and common to said members, rotatable with the other of said members and having a peripheral clutch provision in revoluble peripheral engagement with said provision when in one position and operable during said engagement to permit said differentiation and movable into rotation prevention engagement with and revoluble with said provision when moved to another position and then operable to resist said differentiation, and means for moving said clutch means.

4. In rotation transmissions, members rotatable together and differentially about the same axis, one having a peripheral rotation permission and prevention clutch provision axially intermediate of said members, rotation permission and differentiation prevention axially movable clutch means axially intermediate of and common to said members, rotatable with one of said members and having a perhipheral clutch provision axially intermediate of said members, in operative relation to and co-operable with said provision of the other of said members and in revoluble engagement therewith and revoluble relatively thereto when in one position and in differentiation prevention engagement therewith and revoluble therewith when moved axially from said position, said peripheral provisions comprising the one a circumferentially extended groove and an axially extended recess in communication therewith, and the other a radial peripheral projection entered within and movable circumferentially in said groove, and then operable to permit said differentiation, and movable axially into said recess, and then operable to resist said differentiation, and means for axially moving said clutch means.

5. In rotation transmissions comprising, members rotatable together and differentially about the same axis and each having a rotation permission and differentiation prevention clutch provision in operative relation to that of the other of said members, and rotation permission and differentiation prevention movable clutch means common to said members, having rotation permission and differentiation prevention clutch provisions respectively reciprocal to and movable into engagement with said provisions respectively, for resisting said differentiation, and respectively movable out of engagement with said provisions respectively, for permitting said differentiation, and means for moving said clutch means; the combination therewith of revoluble connections between said clutch means and said members respectively, constructed and arranged to permit rotation of said clutch means with and relatively to each of said members when said provisions are in differentiation permission position, and to permit said clutch means to revolve with both of said members when said provisions are in differentiation prevention position.

6. In rotation transmissions, members revoluble together and differentially about the same axis and each having a rotation permission and prevention clutch provision reciprocal to and in axially fixed space relation to that of the other of said members, and rotation permission and differentiation prevention clutch means movable axially of said members and having coincidently similarly movable rotation permission and differentiation prevention provisions in axially fixed spaced relation, respectively reciprocal to said provisions respectively, and respectively coincidently similarly movable into engagement with said provisions respectively, for resisting said differentiation, and respectively coincidently similarly movable out of engagement with said provisions respectively, for permitting said differentiation, and means for axially sliding said clutch means, said clutch means being rotatable relatively to one of said members during said differentiation, and being rotatable with both of said members during said prevention.

7. In rotation transmissions, members rotatable together and differentially about the same axis, one having a rotation permission and differentiation prevention provision adjacent and in operative relation to the other, rotation permission and differentiation prevention movable clutch means rotatable with the other of said members revolubly engageable with said provision and then operable to permit said differentiation, and resistantly engageable with said provision and then operable to resist said differentiation, and means for engaging and disengaging said clutch means comprising centrifugal clutch operator means in operative relation to said clutch means and said members, rotated by the latter and centrifugally actuated by said differentiation thereof, and then operable to operate said clutch means to resist said differentiation.

8. In rotation transmissions, members rotatable together and differentially about the same axis, one having a rotation permission and differentiation prevention provision adjacent and in operative relation to the other, rotation permission and differentiation prevention movable clutch means rotatable with the other of said members revolubly engageable with said provision and then operable to permit said differentiation, and resistantly engageable with said provision and then operable to resist said differentiation, and means for engaging and disengaging said clutch means comprising counter-poised centrifugal means in operative relation to and counter-poised by said clutch means, in operative relation to and rotated by said members respectively, and centrifugally actuated by differential rotation thereof and then operable to operate said clutch means to resist said differentiation.

9. In rotation transmissions, members rotatable together and differentially about the same axis, one having a rotation permission and differentiation prevention provision adjacent and in operative relation to the other, rotation permission and differentiation prevention movable clutch means rotatable with the other of said members revolubly engageable with said provision and then operable to permit said differentiation, and resistantly engageable with said provision and then operable to resist said differentiation, means for engaging and disengaging said clutch means comprising centrifugal clutch operator means in operative relation to said clutch means and said members, rotated by the latter and centrifugally actuated by said differentiation thereof, and then operable to operate said clutch means to resist said differentiation, manual operating means in operative relation to said clutch means and operable to permit and to overcome said centrifugal operation thereof, and a lost motion connection between said clutch means and said manual means operable to permit said centrifugal operation of the former without molestation from the latter.

10. In rotation transmissions, members rotatable together and differentially about the same axis and one having axially intermediate of said members a rotation permission cylindrical slideway and a rotation prevention clutch provision in operative relation to and adjacent to the other, rotation permission and differentiation prevention axially slidable clutch means axially intermediate of and common to said members, rotatable with and axially slidably connected to the other of said members, having axially intermediate of said members a rotation permission periphery axially slidably engaged with said periphery and rotatable relatively thereto and then operable to permit said differentiation, and having axially intermediate of said members a clutch provision axially slidably engageable with and rotatable with said provision, and then operable to resist said differentiation, and means for axially sliding said clutch means axially of said members.

11. In rotation transmissions, members rotatable together and differentially about the same axis, one having axially intermediate of said members an annular rotation permission provision and a rotation prevention provision axially at each side of the latter, rotation permission and differentiation prevention clutch means rotatable with one of said members and having axially intermediate of said members a clutch projection rotatably engaged with said annular provision when in a mid axial position, and then operable to permit said differentiation, and movable axially from said mid position in either direction into engagement with and engaged by the adjacent one of said prevention provisions, and then operable to prevent said differentiation, whereby to resist the latter upon axial movement of said prevention projection in either direction, and means for moving said prevention projection into said mid position and axially therefrom in either direction.

12. In rotation transmissions, members rotatable together and differentially about the same axis, one having axially intermediate of said members and adjacent to and in operative relation to the other an axial restraint rotation permission provision and a rotation prevention provision in communication with the latter, axial restraint rotation permission and differentiation prevention axially movable clutch means axially intermediate of said members rotatable with one thereof and axially restrained by the other of said members and having axially intermediate of said members, an axial restraint rotation permission and differentiation prevention projection in axial restraint revoluble engagement with said rotation permission provision, and then operable to axially restrain said members and to permit said differentiation, and axially movable into engagement with and revoluble with said rotation prevention provision, and then operable to resist said differentiation, and means for axially moving said clutch means.

13. In rotation transmissions, members rotatable together and differentially about the same axis, one having adjacent axially intermediate of said members and the other a cylindrical male portion having a rotation permission periphery and a rotation prevention recess in communication therewith, rotation permission and differentiation prevention tubular clutch means axially intermediate of said members, rotatable with the other of said members and around and in rotation permission engagement with said periphery for permitting said differentiation, having axially intermediate of said members a movable rotation prevention provision movable into engagement with and revoluble with said recess and then operable to resist said differentiation, and means for moving said projection into and out of said recess.

14. In rotation transmissions, members rotatable together and differentially about the same axis, one having axially intermediate of said members a female socket adjacent and in operative relation to the other having an internal rotation permission periphery and a rotation prevention recess in communication therewith, rotation permission and prevention clutch means axially intermediate of and in operable relation to said members, rotatable with the other of said members, having a cylindrical outer periphery in rotation permission engagement with said periphery, and then operable to permit said differentiation, and having a rotation prevention projection movable into and engaged by and rotatable with said recess, and then operable to resist said differentiation, and means for moving said projection.

15. In rotation transmissions, members rotatable together and differentially about the same axis, each having axially intermediate of said members a rotation permission and prevention provision reciprocal to that of the other, rotation permission and prevention clutch means axially intermediate of and rotatable with and relatively to each of said members and as to which each is relatively rotatable, in axially slideable operative relation to each of said members and having simultaneously similarly axially movable clutch provisions co-operable with said provisions respectively, and revolubly engaged with both said permission provisions when in one axial position for then permitting said differentiation of each relatively to the other and to said clutch means, and simultaneously similarly movable from said position into simultaneous engagement with and revoluble with said prevention provisions respectively, for resisting said differentiation, and means for simultaneously moving said clutch provisions of said clutch means in the same direction.

16. In rotation transmissions, members rotatable together and differentially about the same axis, each having axially intermediate of said members a rotation permission periphery and a rotation prevention provision in operative relation to and spaced from that of the other, rotation permission and differentiation prevention clutch means axially intermediate of and rotatable with and relatively to said members and as to which each is relatively rotatable, having axially intermediate of said members a rotation permission periphery in rotation permission engagement with said peripheries respectively, and then operable to permit said differentiation, and having axially intermediate of said members axially spaced similarly simultaneously movable rotation prevention in operative relation to and provisions similarly simultaneously movable into engagement with said rotation prevention provisions respectively, and then operable to prevent said differentiation, and means for similarly simultaneously moving said provisions of said clutch means into and out of said engagement.

17. In rotation transmisions, members rotatable together and differentially about the same axis and each having a rotation permission and rotation prevention clutch provision in operative relation to that of the other of said members, said provisions being axially spaced a predetermined distance from one another and disposed at each side of a transverse intersection of said axis, and rotation permission and differentiation prevention axially slidable clutch means, rotatable with and axially slidably connection to said members, having rotation permission and differentiation prevention clutch provisions axially spaced said distance, respectively reciprocal to said provisions respectively, and respectively coincidently similarly movable out of engagement with said provisions respectively, for permitting said differentiation, and respectively coincidently similarly movable into engagement with said provisions respectively, for preventing said differentiation, and in axially fixed spaced relation and axially spaced a distance at each side of said intersection, and means for axially moving said clutch means, said provisions of said clutch means being constructed and arranged to revolve with both of said members during said prevention, and to revolve relatively to one of said members during said differentiation.

18. In rotation transmissions, members rotatable together and differentially about the same axis, each having axially intermediate of said member a rotation permission and prevention provision in operative relation to and opposite to that of the other, rotation permission and prevention clutch means axially intermediate of said members and around and rotatable with and relatively to said members and as to which each is relatively rotatable, having axially intermediate of said members rotation permission and prevention provisions in operative relation to said provisions respectively, and revoluble with said provisions when in one position to permit said differentiation and revoluble relatively to said provisions when in another position to resist said differentiation, and means for operating said clutch means.

19. In rotation transmissions, members rotatable together and differentially about the same axis, having axially adjacent portions and each having a rotation permission and prevention clutch provision reciprocal to and in operative relation to that of the other of said members, and rotation permission and differentiation prevention movable clutch means common to said members, having rotation permission and differentiation prevention clutch provisions respectively reciprocal to said provisions respectively, respectively movable out of engagement with said provisions respectively, for permitting said differentiation, and respectively movable into engagement with said provisions respectively, for preventing said differentiation, and means for moving said clutch means, said clutch means being carried by both of said members and being axially extended past and from one to the other side of said axially adjacent portions of the latter, and being movable axially of both of said adjacent portions, and being revoluble with both of said members during said prevention and revoluble relatively to each of said members during said permission.

20. In rotation transmissions, relatively rotated members rotatable together and differentially about the same axis, each having axially intermediate of said members adjacent and cooperable with the other a rotation prevention provision and a plurality of axially spaced rotation permission provisions in communication therewith, rotation permission and prevention axially movable clutch means axially intermediate of and rotatable with and relatively to said members and as to which each is relatively rotatable, having axially intermediate of said members rotation permission and prevention provisions in operative relation to said provisions respectively, engageable when in one axial position with said prevention provisions respectively, and then operable to resist said differentiation, and axially movable from said engagement into either of said rotation permission provisions respectively, and then operable to permit said differentiation, and means for axially moving said clutch means in either direction.

GEORGE HOLT FRASER.